United States Patent

[11] 3,615,727

| [72] | Inventor | Armin Starke<br>Steirtweite 15, 2000 Hamburg 11, Germany |
|---|---|---|
| [21] | Appl. No. | 625,371 |
| [22] | Filed | Mar. 23, 1967 |
| [45] | Patented | Oct. 26, 1971 |

[54] METHOD OF PRESERVING
3 Claims, 3 Drawing Figs.

[52] U.S. Cl. .................................................. 99/225,
99/150 R, 99/151, 99/201, 99/211, 99/212
[51] Int. Cl. ............................................... A23l 3/34
[50] Field of Search ........................................... 99/199,
150, 56, 104, 203, 224, 225, 153, 201; 21/58

[56] References Cited
UNITED STATES PATENTS

| 3,410,701 | 11/1968 | Ciboit............................ | 99/203 |
| 3,395,022 | 7/1968 | Vollink et al. .................. | 99/199 X |
| 3,341,335 | 9/1967 | Eolkin et al..................... | 99/150 |
| 3,341,280 | 9/1967 | Eolkin........................... | 99/150 X |
| 3,163,494 | 12/1964 | Kaye ............................. | 99/150 |

*Primary Examiner*—Lionel M. Shapiro
*Assistant Examiner*—D. M. Naff
*Attorney*—Rudolph J. Jurick

ABSTRACT: A method for stabilizing foodstuffs, other nutrients and pharmaceutical compositions comprising the features of providing the product with outwardly open capillary apertures and applying thereto under a vacuum substances in the form of gases or vapors.

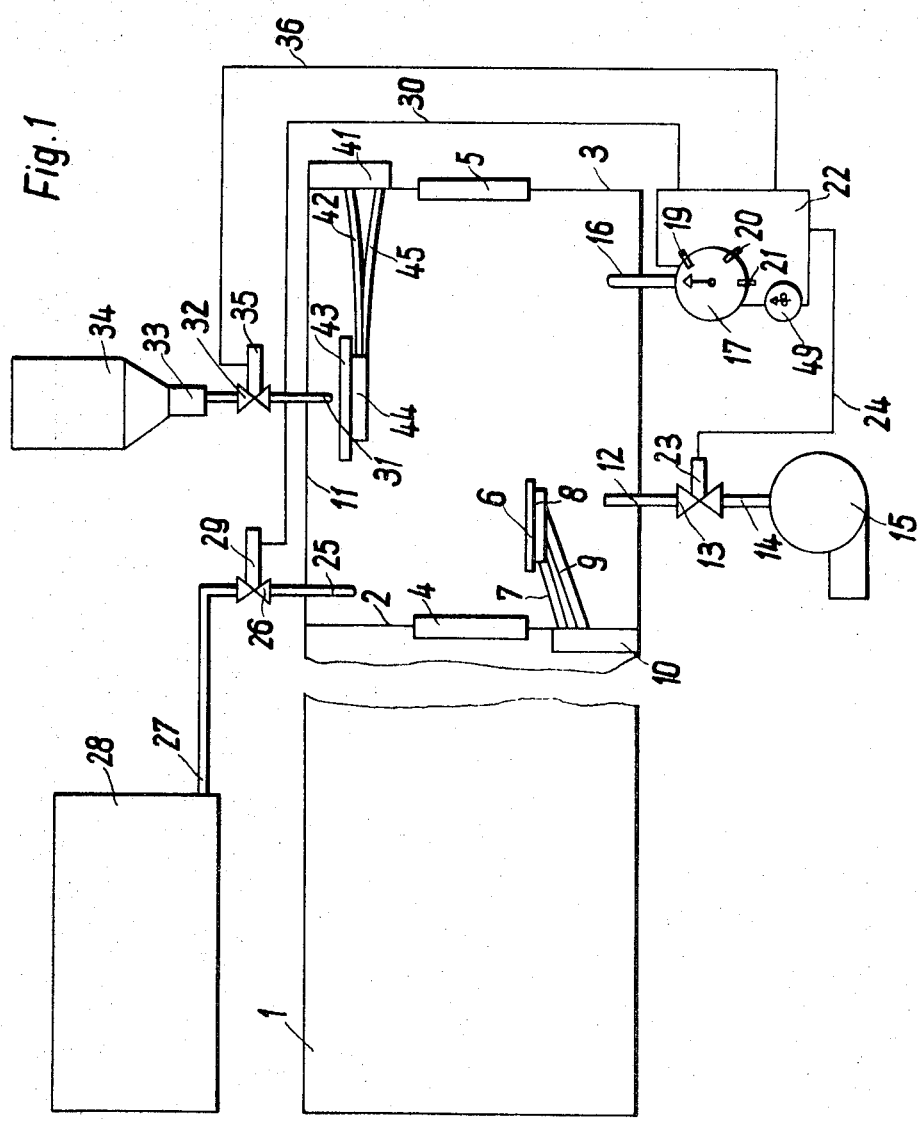

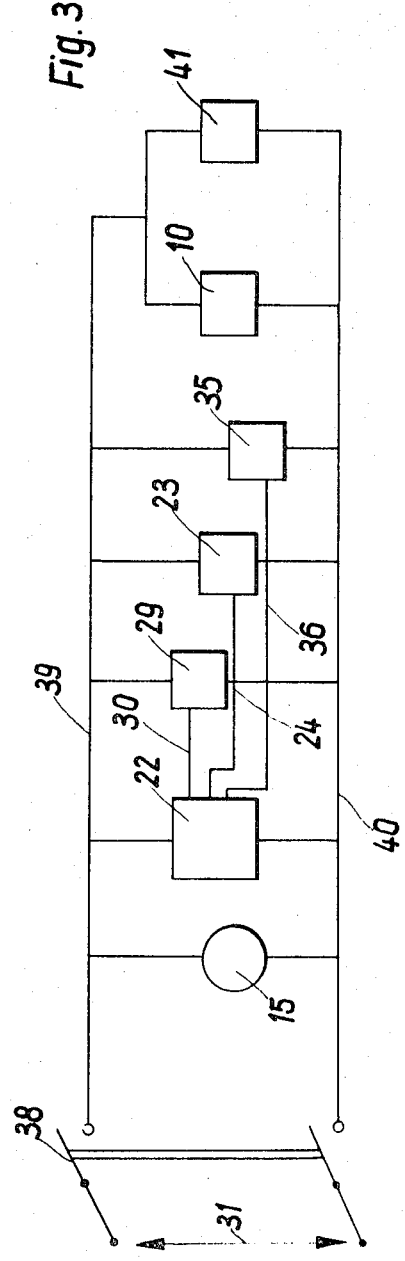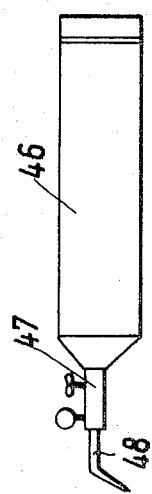

METHOD OF PRESERVING

DESCRIPTION

The invention relates, as indicated to a method for stabilizing foodstuffs and other nutrients, such as, for example, animal-feeding stuffs and pharmaceutical preparations, wherein a substance is applied as a vapor or gas under a vacuum so as to act on the foodstuff or the like or on the pharmaceutical product.

Since foodstuffs represent the preferred application of the invention, these are mentioned in the following. However, the term "foodstuffs" is also intended to include the other nutrients mentioned above.

It is already known to package foodstuffs under nitrogen and to seal the package. Nitrogen forms a neutral barrier layer on the material by adsorption. Such methods are used, for example, for packaging foodstuffs which have been treated by the freeze-drying process.

In this method which operates under a vacuum, after the end of the drying, the vacuum is relieved by introducing a gas. Preferably a gas such as nitrogen or carbon dioxide is used. Subsequent packaging is also carried out, for example, under nitrogen. It has been shown that such a method does not give the desired results, even when other inert gases are used. The reason seems to be that the foodstuffs still contain enzymes which impair the stability and are not attacked by the added inert gas. For example, products containing fat become rancid. The agents added for avoiding this drawback, such as antioxidants, sugars and the like, represent only a small improvement. The fermentative processes also lead to degradation reactions. For this reason, enzyme poisons have been added in the liquid state, for example, as solution, but these are required in substantial quantities.

It is also known to stabilize certain foodstuffs, such as butter, condensed milk, marzipan and the like, by adding alcohol. The alcohol is worked into the material in the liquid state, or kneaded into the same. Also this requires comparatively large quantities, for example, of the order of magnitude of 2 percent. This renders the product much more expensive so that this method is not generally used, although alcohol is known as an enzyme poison.

In more recent methods for treating foodstuffs, such as in the freeze-drying method, treatment of the foodstuff with a liquid solution of an enzyme poison is not possible. These enzyme poisons would evaporate under a high vacuum, or, if used after the drying, would soften the surface without penetrating into the interior.

Hence, with the use of a freeze-drying method, considerable difficulties have been encountered in order to stabilize the foodstuffs. Certain application of the freeze-drying method are already excluded, e.g., the drying of whole milk or cream, because the dried products are not stable for a sufficiently long time.

According to the invention, the products are provided, by means of a known drying or piling into a mass, with outwardly open, capillary passages, and thereafter, with a least partial relieving of the vacuum by means of a gaseous or vaporous material, an enzyme poison (enzyme deactivator) is added in such an amount that the enzyme or enzymes are deactivated by direct action. Preferably, on adding the enzyme poison, the vacuum is partially reduced and is then relieved by the use of a known inert gas.

According to the present invention, a substantially longer stability is attained for dried foodstuffs, such as milk and cream, if gaseous or vaporous materials are added under a vacuum to the dried products, which deactivate the enzymes or certain of these enzymes.

Since in this case, an atmosphere inhibiting the diffusion of the gaseous or vaporous enzyme poison of absent, the surface is the dried product is immediately charged uniformly and completely with the enzyme poison applied. In principal, any dried foodstuff can be so treated, independently of the drying method employed.

Most intensively, the enzyme deactivation according to the method of the invention is achieved in dried products, produced according to the freeze-drying method. Owing to the function of this method, dried products are obtained, in which no hardening or incrustation of the surface of the dried particles occurs. The capillaries and cavities inside the dried particles communicate with each other and, owing to the absence of hardening, also with the outside of the particles so that, with the same weight, the dried products produced by means of the freeze-drying method, have a substantially larger surface area than those produced in accordance with other methods, and offer therefore a larger attacking surface to the enzyme poison. Hence, an essential feature of the invention consists in treating dried foodstuffs with upwardly open, capillary passages.

For avoiding hardening or incrustation, the invention also comprises the use of the known spray-drying method. This method is used, for example, for milk. In this method, the products, formed into particles by spray-drying, are subjected to accumulation, to a vacuum and to the treatment. Preferably, the mass is introduced into containers, such as bags, permitting the diffusion, and then treated under a vacuum.

According to a particularly preferred embodiment of the invention, the enzyme deactivator used is ethyl alcohol.

According to the invention, both with continuous and with intermittent freeze-drying installations, prior to the reduction of the vacuum, i.e., after the completion of the drying, the alcohol is introduced into the chamber as a gas or liquid; in the latter case, the evaporation must take place in the chamber. With the introduction of the alcohol into the vacuum chamber. there occurs a pressure rise by about 10 to 30 mm. Hg, according to the amount of alcohol applied, so that another gas, e.g., nitrogen, is then introduced to reduce the vacuum. Thus, an additional protective layer is provided on the surface of the dried material, against atmospheric oxidation.

An example, of the use in connection with spray-drying comprises the manufacture of cream powder. This cream powder is placed into fabric bags, e.g., of linen, and is then subjected to a vacuum, and more particularly to a high vacuum of the order of 0.6 mm. Hg. During a first reduction step, in which the enzyme poison is added, the vacuum is reduced to 12 mm. Hg. This is followed by flooding with a known inert gas, such as nitrogen. However, the reduction of the vacuum may also be effected in one step under addition of the enzyme poison.

With this method of enzyme deactivation, frequently very small amounts of alcohol are sufficient, of the order of magnitude of about 0.3 percent by weight, related to the foodstuff, which are substantially below the quantities which must be added according to other methods. Since according to the invention, the effects of a deactivating agent are intensified, there is the advantageous possibility of using hitherto rejected substances in amounts in which they have been regarded as ineffective. Accordingly, according to the invention, also sulfur dioxide may be used as enzyme deactivator, in addition to alcohol. Although the efficiency of this substance in an amount of 0.05 percent has hitherto been regarded as questionable and in an amount of 0.03 percent as negative, it is an essential feature of the invention that this substance, if used in accordance with the method of the invention, has an enzyme-deactivating action even in this low concentration. According to the invention, hydrogen sulfide is introduced as gas or vapor. According to yet another feature, formaldehyde is introduced as gas or vapor.

An essential feature of the preceding statement is that more particularly the hitherto rejected extraneous substances are added in amounts which are below the hitherto accepted efficiency limits. Hence, a particular embodiment consists in adding these substances in amounts of up to 0.05 percent by weight.

It has already been stated that, for raising the pressure, another gas, e.g., nitrogen, is introduced. According to a special embodiment, the packaging is effected in a gastight manner under a nitrogen cover. According to another embodiment of the method according to the invention, the foodstuffs are packed under a vacuum, after they have been exposed to the vapor or gas. In both methods, also with the gastight packaging, a drop of alcohol is added to the package; this improves the effects yet further.

Where reference has been made hereinbefore to enzymes, it should be noted that those concerned are particularly those which affect foodstuffs, cannot be rendered ineffective by treatment at normal or low temperature, and lead to degradation reactions.

The invention will be further described with reference to the accompanying drawings, showing embodiments of apparatus for carrying out the method of the invention, and in which:

FIG. 1 shows in partial cross section a side elevation of a diagrammatically drawn arrangement for carrying out the method of the invention;

FIG. 2 shows a detail for use in the arrangement of FIG. 1;

FIG. 3 shows diagrammatically a circuit for the control arrangement according to FIG. 1.

In all Figures, identical parts are marked with the same reference numerals.

FIG. 1 shows diagrammatically a freeze-drying installation 1. At the end of a tunnel-shaped housing which may contain transportation means for the foodstuffs to be frozen, there is a gate having end walls 2 and 3. These end walls are equipped with passages 4,5. These passages are adapted to be closed by doors in a gastight manner, as shown in the drawing.

It should be mentioned that such an entire installation may also consist only of such a chamber between end walls 2, 3, and having, for example, a cylindrical shell 11, which connects these end walls.

In the latter case, the gate is equipped with heating plates, one of which is indicated at 6. This plate is held on a bracket 7 on the end wall 2 and is equipped with a heating device 8 connected by a lead 9 with a terminal unit 10.

Into the cylindrical shell 11 leads a tube socket 12 which is terminated by a blocking valve 13. This valve 13 communicated via a tube socket 14 with a vacuum pump 15, the housing of which also houses an electric motor, shown in FIG. 3 and also marked with the reference numeral 15.

In addition, into the housing also leads a connecting socket 16 for a pressure gage 17, the pointer of which is shown at 18. This pointer may be associated, for example, with three stop contacts 19, 20, 21, adapted to be adjusted along the scale and which carry out a control function upon contact with the pointer or with a member attached thereto.

Control members in which the impulse generated by the pointer may be transformed and/or amplified and/or maintained for a given period of time, the termination of which depends on the position of the pointer, are housed in the associated control device 22. Obviously, the construction of the said contacts may be such that they become effective only when actuated by the pointer moving in a certain direction.

The blocking valve 13 is equipped with an electromechanical actuating device 23, connected to the control device 22 by connecting means 24. This electromechanical actuating device 23 serves for adjusting the valve 13 as a function of signals, applied through the connecting means 24.

The upper portion of the housing 11 is also equipped with a further tube socket 25, terminating inside the housing shell and in an adjustable metering valve 26. This valve is connected by way of a connecting conduit 27 to a storage tank or source 28 for nitrogen. The second valve 26 is also equipped with an electromechanical actuating device, 29, such as known in the art, whereby the said valve can be adjusted, and more particularly opened and closed, as a function of signals, applied by the connecting means 30. These connecting means connect the actuating device with the control device 22.

A third connecting socket 31 terminates also in the upper part of the housing shell 11 and leads to a blocking or metering valve 32. This valve is connected by a conduit with a connecting fitting 33. In FIG. 1, this fitting communicates with a storage tank 23 for a so-called enzyme deactivator or enzyme poison, and more particularly alcohol. The said valve 32 is equipped with a further electromechanical-actuating mechanism 35 for opening and closing the valve. This action is triggered off by signals applied through connecting means 36, extending between the actuating mechanism 35 and the control device 22.

For an electrical control, the parts must be connected to a power source or to the mains, in order to produce the operating voltage. This circuit is shown in FIG. 3, where the installation is connected, by way of example, to a DC source 37, by means of a main switch 38. The control devices, hereinbefore described, as well as the actuating mechanisms, are connected between the leads 39, 40 (these devices being shown in FIG. 3 under the same reference numerals as in the preceding Figures). FIG. 3, also shows the connecting means 24, 30, 36, for transmitting the signals between the said parts.

Adjacent to the connecting device 10, FIG. 3 shows a further connecting device 41. This latter device 41 is provided, if the container 34 (FIG. 1) contains, for example, alcohol, as enzyme deactivator. In this case, a heating plate 43, associated with a heating device 44, is arranged under the tube socket 31 and is supported on the wall 3 by a bracket 42. It is connected to the connecting device 41 through connecting means 45. If liquid alcohol is applied to the hot plate 42, it is thus caused to evaporate.

This hot plate 43 is not necessary if the alcohol is supplied as vapor. Thus, for example, a pressure vessel 46 may be connected to the fitting 33 (FIG. 2), and may be equipped with a known fitting 47 and a connector 48. This connector 48 is then connected to the fitting 33. The bottle may contain, for example, $SO_2$, acting as enzyme poison.

The apparatus is made ready for operation by closing the main switch 38. In this case, freeze-dried material or material to be dried, is located in the chamber between the end walls 2, 3. The materials has previously been frozen, as known in the art. In the embodiment, in which the chamber is only the final stage gate, the heating plate 6 is omitted, otherwise the water is sublimated after closure of the doors 4,5. The vacuum pump 15 evacuates the device to a certain pressure. The heating plates 6 and 43 are heated. When the vacuum has been held for a certain period, which may be measured by means of the stop contact 21 and a timing clock 49 in the control device 22, the vacuum pump is stopped through the connection 24, and the timing member may be triggered at the same time. After the rundown of this timing member, the valve 32 is actuated via 36 and alcohol is applied to the heating plate 43 where it evaporates. This causes the vacuum in the chamber to drop. When, for example, the pointer 18 now reaches the stop contact 20, a signal is applied via the connecting means 36 for closing the valve 32, and via the connecting means 30 for triggering off the actuating mechanism 29 for opening the valve 26. Nitrogen flows into the chamber, whereby the vacuum is further reduced. When the pressure is reached, for example, at which the pointer of the pressure gage 17 contacts the stop contact 19, another signal is applied via the means 30 for closing the valve 26. Now the pressure in the chamber is such that the doors can be opened and the material can be extracted for further packaging.

I claim:

1. A method of preserving and stabilizing freeze-dried foodstuffs, feeding stuffs, pharmaceutical products and the like, which method comprises placing the product under vacuum and adding an enzyme deactivator in the form of a gaseous or vaporous substance with at least a partial reduction of the vacuum, said substance being ethyl alcohol added in such an amount that the product comprises about 0.3 percent by weight thereof.

2. The method as set forth in claim 1, including the introduction of a protective gas after the said partial reduction of the vacuum.

3. The method as set forth in claim 1, wherein the product is placed into permeable containers prior to the vacuum and enzyme-deactivating treatment.

* * * * *